April 29, 1924.
H. B. GARMAN
1,491,906
BEARING AND METHOD OF MAKING THE SAME
Filed Aug. 2, 1921
2 Sheets-Sheet 1
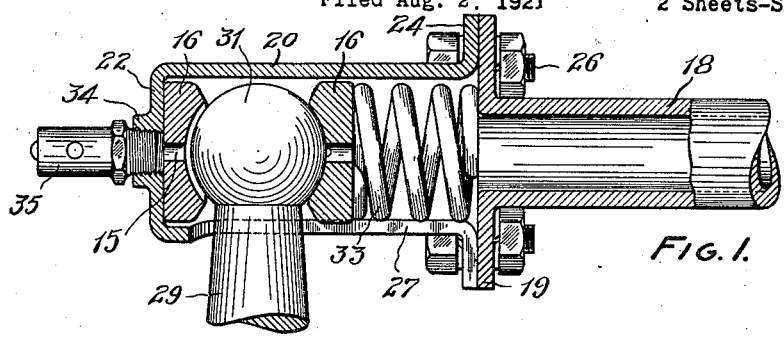
FIG. 1.
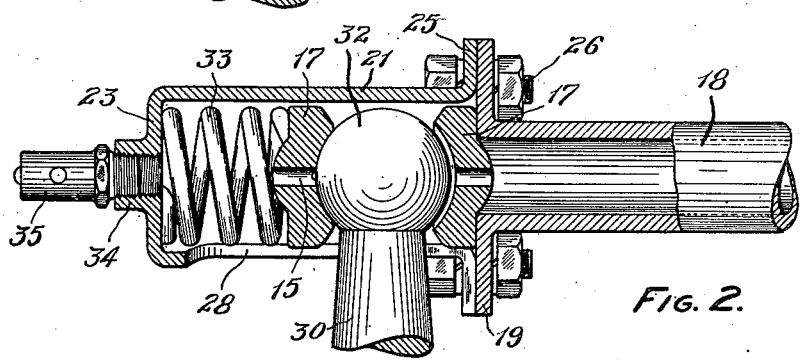
FIG. 2.
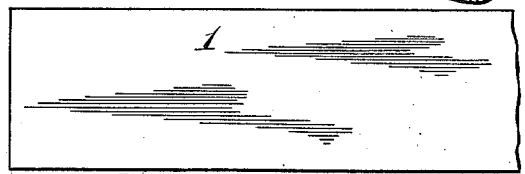
FIG. 3.
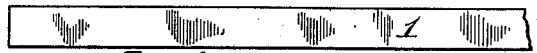
FIG. 4.
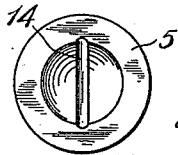
FIG. 7.
FIG. 8.
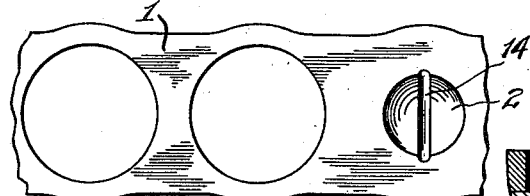
FIG. 5.
FIG. 6.
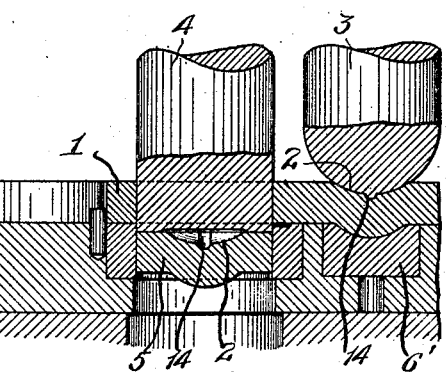
FIG. 9.
INVENTOR:
HARRY B. GARMAN
BY  *C. E. Merkel,*
ATTORNEY

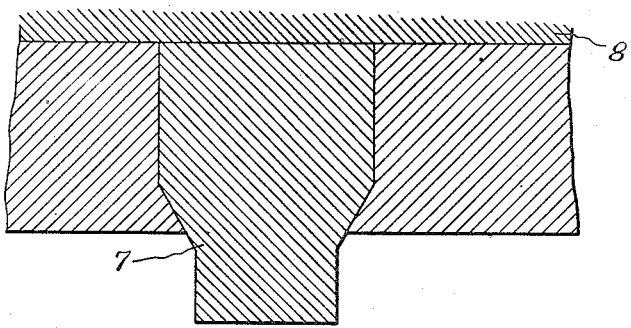
Fig. 10.
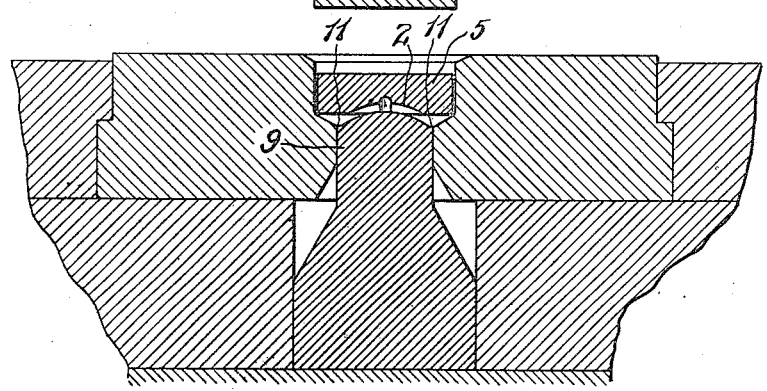
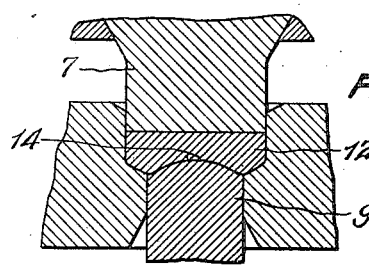
Fig. 11.
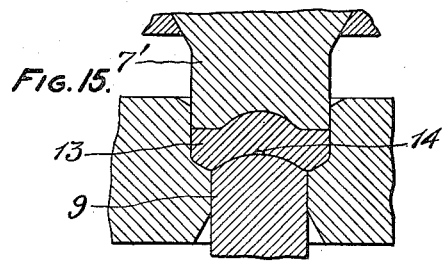
Fig. 15.
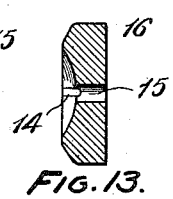
Fig. 12. Fig. 13.
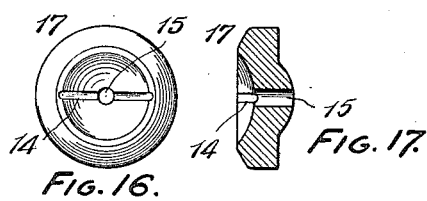
Fig. 16. Fig. 17.
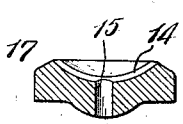
Fig. 14.
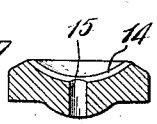
Fig. 18.
INVENTOR:
HARRY B. GARMAN
ATTORNEY Patented Apr. 29, 1924.

1,491,906

UNITED STATES PATENT OFFICE.

HARRY B. GARMAN, OF DETROIT, MICHIGAN, ASSIGNOR TO THE STEEL PRODUCTS COMPANY, OF CLEVELAND, OHIO, A CORPORATION OF OHIO.

BEARING AND METHOD OF MAKING THE SAME.

Application filed August 2, 1921. Serial No. 489,365.

*To all whom it may concern:*

Be it known that I, HARRY B. GARMAN, a citizen of the United States, resident of Detroit, county of Wayne, and State of Michigan, have invented new and useful Improvements in Bearings and Methods of Making the Same, of which the following is a specification, the principle of the invention being herein explained and the best mode in which I have contemplated applying that principle, so as to distinguish it from other inventions.

My invention relates to improved bearings and improved methods of making the same and particularly to mechanism of this character adapted for use with co-operative journal surfaces which are large compared to the dimensions of the bearing surface. More particularly, my invention relates to improved bearings adapted for use in drag links forming part of the steering mechanism of automobiles and the invention is illustrated in the accompanying drawings and hereinafter described as part of a drag link construction, in order well to illustrate one field in which my improved bearing may be efficiently employed. The design of the invention is to form an article of this character which can be economically manufactured from a grade of steel no better than a good grade of machinery steel, hot rolled pickled steel, for instance, such steel by my improved method furnishing a bearing having a very smooth wearing surface and in which the steel of the final product is well refined.

The annexed drawings and the following description set forth in detail certain means embodying my improved bearing and certain steps exemplifying my improved method, the disclosed means and steps, however, constituting but one of the various mechanical forms in which the principle of the invention may be employed and but one of the various ways in which the same may be carried out.

In said annexed drawings:

Figures 1 and 2 represent partial side elevations and partial central vertical sections of the axle arm end and the steering arm end, respectively, of an assembled drag link in which my improved bearings form part of the elements.

Figures 3 and 4 represent, respectively, plan and side views of a piece of bar stock from which my improved bearings are made.

Figure 5 represents a plan view of this strip of stock, showing the effect thereon of a punching operation and a blanking operation by a gang and follow die, utilized in some of the steps of my improved method of manufacturing bearings.

Figure 6 represents a central vertical section of said strip of bar stock and said gang and follow die, illustrating particularly a die for use in making one type of improved bearing having a flat back.

Figures 7 and 8 represent, respectively, a plan view and an axial section of the blank for one of the bearings as punched out from the bar stock shown in Figure 3.

Figure 9 represents a section similar to that shown in Figure 6, illustrating a die utilized for forming a modified type of bearing having a convex back.

Figure 10 represents a fragmentary central sectional view of a coining die, in a partially open position, utilized for performing the last step of my improved method, in the manner by which the method is illustrated in the accompanying drawings.

Figure 11 is a fragmentary view, similar to that shown in Figure 10, showing the dies in their closed position.

Figures 12, 13 and 14 are, respectively, a plan view, a central vertical section and a central horizontal section of the completed bearing of the flat back type.

Figure 15 is a view similar to Figure 11, showing a convex back type of blank.

Figures 16, 17 and 18 are, respectively, a plan view, a central vertical section and a central horizontal section of a completed bearing of the convex back type.

Referring to the annexed drawings in which the same parts are denoted in the several figures by the same ordinals, respectively, a piece of bar stock is indicated by the ordinal 1, Figure 3, which, by the first step of my improved method, is recessed with a punch 3, as illustrated by the ordinal 2, Figure 5, this operation also resulting in a condensing of the metal of the bar stock. The bar is then fed under a punch 4, which blanks from the bar a disk 5 of somewhat different dimensions than the finished bearing, for instance, the diameter of the blank 5 is smaller than that of the finished bearing, as hereinafter fully explained. The dies cooperating with the punch 3 vary in design, as illustrated by Figures 6 and 9 herein, respectively. The dies 6 and 6', respectively, are utilized eventually resulting in a bearing 16 with a flat back in the one case, Figure 13, and in a bearing 17 with a convex back in the other case, Figure 17, the latter type of bearing being produced with less stress upon the dies.

The blank 5 is then put in a coining press capable of still further condensing the metal by exerting comparatively heavy pressures, for instance, capable of delivering a blow of four hundred (400) tons. By this means the blank is formed up into the bearing of the desired shape and dimensions, and being, as a result of the above-described series of operations, composed of metal which is well refined and having, as a result of the press-coining and the attendant compression, a very smooth and hard wearing surface. Parts of this coining press are illustrated in Figure 10 in which is shown the punch 7, a suggestion of a ram 8, a die 9 and other incidentals to press operation such as punch-holders, die-holders, fillers, etc. It will be noted that the diameter of the blank 5 as it appears in the press shown in Figure 10 is somewhat less than that of the face of the punch 7. Furthermore, other dimensions of the blank 5 are different from those of the finished bearing, as, for instance, it will be noted that the diameter of the recess 2 is considerably less than the diameter of the concave bearing surface which will be formed in the bearing by the die 9 and which is illustrated by the distance between the points 11, Figure 10. As illustrated in Figures 11 and 15, the flat back type of bearing 12, and the convex back type of bearing 13, respectively, are formed up in the coining press by means of suitably designed punches 7 and 7', resulting in a product of the qualities above mentioned.

Incidental to the recessing operation illustrated by the ordinal 2, Figure 5, a groove 14 is formed in the bar stock. This groove is utilized, as hereinafter fully described, for the efficient lubrication of the connecting arm balls of a drag link with which the bearings cooperate. After the bearings are coined as illustrated by the ordinals 12 and 13, the same are drilled to form holes 15, which also are utilized for lubricating purposes as hereinafter fully explained. The two types of bearings complete with their lubricating grooves and holes are indicated by the ordinals 16 and 17, respectively, Figures 12 to 18 inclusive.

Heretofore, insofar as I am aware, bearings of this character have been made on screw machines. When it is desired to impart a smooth and hard wearing surface to such bearings, they must be subjected to a special hardening process. By my improved method, however, I am able to dispense with this special hardening process, inasmuch as by my said process the density of the metal on the exterior surface is greatly increased whereby an outer portion of increased hardness is produced for forming the required hard wearing surface.

Referring to Figures 1 and 2, an intermediate member of an improved drag link is indicated by the ordinal 18, the same being, in the form of device illustrated, made from standard seamless steel tubing. This tubing element 18 is formed on both ends with flanges 19 upset, these flanges having drilled therethrough holes, for a purpose hereinafter fully described. Both ends of the drag link are illustrated in Figures 1 and 2, the axle arm end being illustrated in Figure 1 and the steering arm end, in Figure 2. Removably secured to the tubular element 18 are end sockets 20 and 21 whose inner ends communicate with the tube 18, and whose outer ends 22 and 23, respectively, are closed and formed of metal continuous with the walls of the sockets. These sockets 20 and 21 are stamped from hot rolled annealed steel and have inner end flanges 24 and 25 through which are drilled holes adapted to register with the flange holes of the intermediate tube 18, whereby by means of the bolts 26 the intermediate tube 18 and sockets 20 and 21 are removably secured together to form the complete casing of the drag link. The sockets 20 and 21 are milled to form extended slots 27 and 28 respectively, open at their inner ends, providing for the lateral shifting of the connecting arms hereinafter described. These connecting arms are, respectively, the axle arm 29 and the steering crank arm 30 formed, respectively, at their inner ends with balls 31 and 32 which are journaled in the improved bearings 16 and 17, the bearings 16 in the axle arm end of the link being, for purposes of illustration, of the flat back type, and the bearings 17, in the steering arm end of the drag link being, for the purpose of illustration, of the convex back type. The width of the extended slots 27 and 28 is less than the diameter of the adjacent balls 31 and 32, so that there is no chance for the drag link to drop off the ball arm. As is usual in constructions of this nature, springs 33 are provided, the same being made from round spring steel in the usual way, and disposed, respectively, between the closed end of the socket 21 and the bearing block 17 adjacent the ball 32, in the case of the steering crank arm of the link, and, in the case of the axle ball arm of the link, being positioned between the adjacent end of the intermediate tube 18 and the bearing block 16 disposed adjacent the ball 31. This arrangement of the springs provides for a cushion action, regardless of which wheel of the automobile strikes a bump or settles into a hole in the pavement or road.

In order to efficiently lubricate the wearing surfaces, I draw bosses 34 in the outer ends of the sockets 20 and 21, within which are accommodated grease cups 35. These cups 35 discharge upon the surfaces of the balls 31 and 32 through the holes 15 and the lubricant is efficiently distributed upon the ball surfaces by means of the grooves 14 formed in the bearings 16 and 17.

It will be noted in Figures 1 and 2 that the bearings upon opposite sides of the balls 31 and 32 are positioned so that the oil grooves 14 lie in relatively transverse planes upon the two sides of the ball, the bearings being preferably initially positioned so that these grooves lie in relatively right angular planes.

What I claim is:

1. A bearing formed of hot rolled pickled steel subjected to press-coining so as to impart thereto the desired shape, whereby an outer portion of increased density and hardness is formed, said bearing having a concave spherical bearing surface intersecting one face thereof.

2. In a method of manufacturing bearings, the steps which consist in recessing a bar of steel stock; punching therefrom a bearing blank of dimensions different from those of the finished bearing; and then press-coining the blank to form the finished bearing, thus refining the steel and forming a smooth wearing surface.

3. In a method of manufacturing bearings, the steps which consist, in recessing a bar of steel stock, the metal being condensed by this operation; punching therefrom a bearing blank of a diameter smaller than that of the finished bearing; and then press-coining the blank to form the finished bearing, thus refining the steel and forming a smooth concave wearing surface.

Signed by me this 29th day of June, 1921.

HARRY B. GARMAN.